(12) United States Patent
Droege et al.

(10) Patent No.: US 7,341,383 B2
(45) Date of Patent: Mar. 11, 2008

(54) DUAL INNER DIAMETER FERRULE DEVICE AND METHOD

(75) Inventors: Scott Droege, Burnsville, MN (US); Steven C. Zimmel, Minneapolis, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/497,175

(22) Filed: Aug. 1, 2006

(65) Prior Publication Data

US 2008/0031573 A1 Feb. 7, 2008

(51) Int. Cl.
*G02B 6/36* (2006.01)
(52) U.S. Cl. ...................................... 385/78
(58) Field of Classification Search ................. 385/78, 385/60, 62
See application file for complete search history.

(56) References Cited

U.S. PATENT DOCUMENTS

| 4,931,120 A | 6/1990 | Christoff ..................... 156/153 |
| 5,152,816 A | 10/1992 | Berkey ......................... 65/429 |
| 5,185,838 A | 2/1993 | Lüottgert et al. ............. 385/84 |
| 5,216,734 A | 6/1993 | Grinderslev ................. 385/60 |
| 5,615,291 A | 3/1997 | Hayakawa et al. ........... 385/84 |
| 5,862,280 A | 1/1999 | Tanaka et al. ................ 385/78 |
| 5,883,995 A | 3/1999 | Lu .............................. 385/60 |
| 5,989,106 A | 11/1999 | Tanaka et al. ............... 451/49 |
| 6,629,782 B2 | 10/2003 | McPhee et al. .............. 385/78 |
| 6,916,120 B2 | 7/2005 | Zimmel et al. ............... 385/78 |
| 2004/0161205 A1* | 8/2004 | Hengelmolen et al. ....... 385/78 |
| 2005/0232553 A1 | 10/2005 | Holmquist et al. .......... 385/78 |

FOREIGN PATENT DOCUMENTS

JP 07174937 A 12/1993

OTHER PUBLICATIONS

Exhibit I—copy of FIG. 8 from U.S. Appl. No. 11/497,175, admitted as prior art as of Aug. 1, 2006.

* cited by examiner

*Primary Examiner*—Quyen P Leung
(74) *Attorney, Agent, or Firm*—Merchant & Gould P.C.

(57) ABSTRACT

A fiber optic ferrule includes a body extending from a first end to a second opposite end, with the body including an axial passage extending between the first and second ends. The axial passage includes a first diameter portion having a diameter of at least 125 microns, and a second diameter portion having a diameter of at least 250 microns and less than a diameter of the buffer, the second diameter portion positioned between the first diameter and the second end. The axial passage further defines a tapered shape at the second end extending inward from the second end to the second diameter portion. A hub holds the ferrule. A method of assembling a terminated fiber optic cable is also provided.

2 Claims, 7 Drawing Sheets

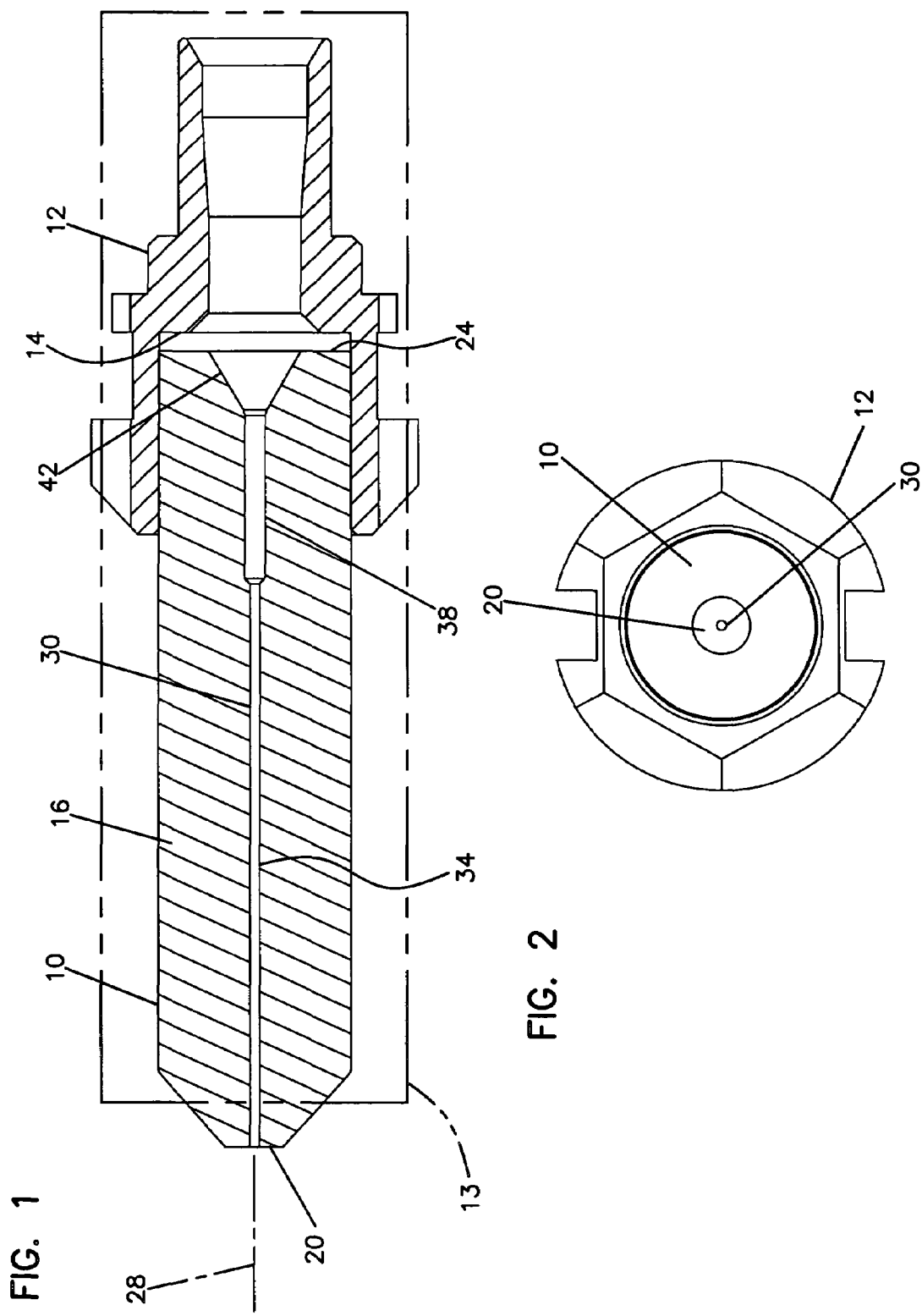

DUAL INNER DIAMETER FERRULE DEVICE AND METHOD

FIELD OF THE INVENTION

The present invention relates to terminating the ends of fiber optic cables with ferrules.

BACKGROUND OF THE INVENTION

Typically the end of a fiber optic cable is terminated by a fiber optic connector by gluing the fiber within the cable to a ferrule of the connector. A well known fiber optic cable size includes an inner glass fiber of 125 microns in diameter, with an outer coating of 250 microns in diameter, covered by a polymeric buffer layer of 900 microns in diameter.

One problem with terminating fiber optic cables can include fiber breakage at the rear interface area between the end of the glass fiber and the ferrule. In this interface area is the epoxy used to hold the fiber to the ferrule. Such breakage tends to increase in response to greater temperature fluctuations during use of the cables. Differences in thermal expansion are believed to cause the breakage. There is a need to improve the interface between fiber optic cables and connectors to reduce fiber breakage, especially due to thermal stress.

SUMMARY OF THE INVENTION

A fiber optic ferrule includes a body extending from a first end to a second opposite end, with the body including an axial passage extending between the first and second ends. The axial passage includes a first diameter portion having a diameter of at least 125 microns, and a second diameter portion having a diameter of at least 250 microns, the second diameter portion positioned between the first diameter and the second end. The axial passage further defines a funnel shape at the second end extending inward from the second end to the second diameter portion.

A method of assembling a terminated fiber optic cable includes providing a cable with an inner fiber at 125 microns, an outer coating at 250 microns, and a buffer layer at 900 microns. The method includes stripping a portion of the coating from an end of the cable to expose a portion of the inner fiber, and stripping a portion of the buffer layer to expose a portion of the coating. The method further includes inserting the exposed fiber and the exposed coating into a ferrule having first and second inner diameters, wherein the first diameter is at least 125 microns, and the second diameter is at least 250 microns, and adhesively holding the fiber to the ferrule.

The present invention also relates to a device and method for mounting a fiber to a ferrule wherein the ferrule includes a first passageway portion sized only to receive a bare fiber without a coating or a buffer layer, and a second passageway portion sized to receive the fiber including the coating, but no buffer layer.

BRIEF DESCRIPTION OF THE DRAWINGS

FIG. 1 is a cross-sectional side view of one embodiment of a ferrule and a hub in accordance with the present invention;

FIG. 2 is an end view of the ferrule and hub of FIG. 1;

DETAILED DESCRIPTION OF THE PREFERRED EMBODIMENT

Figure 3:
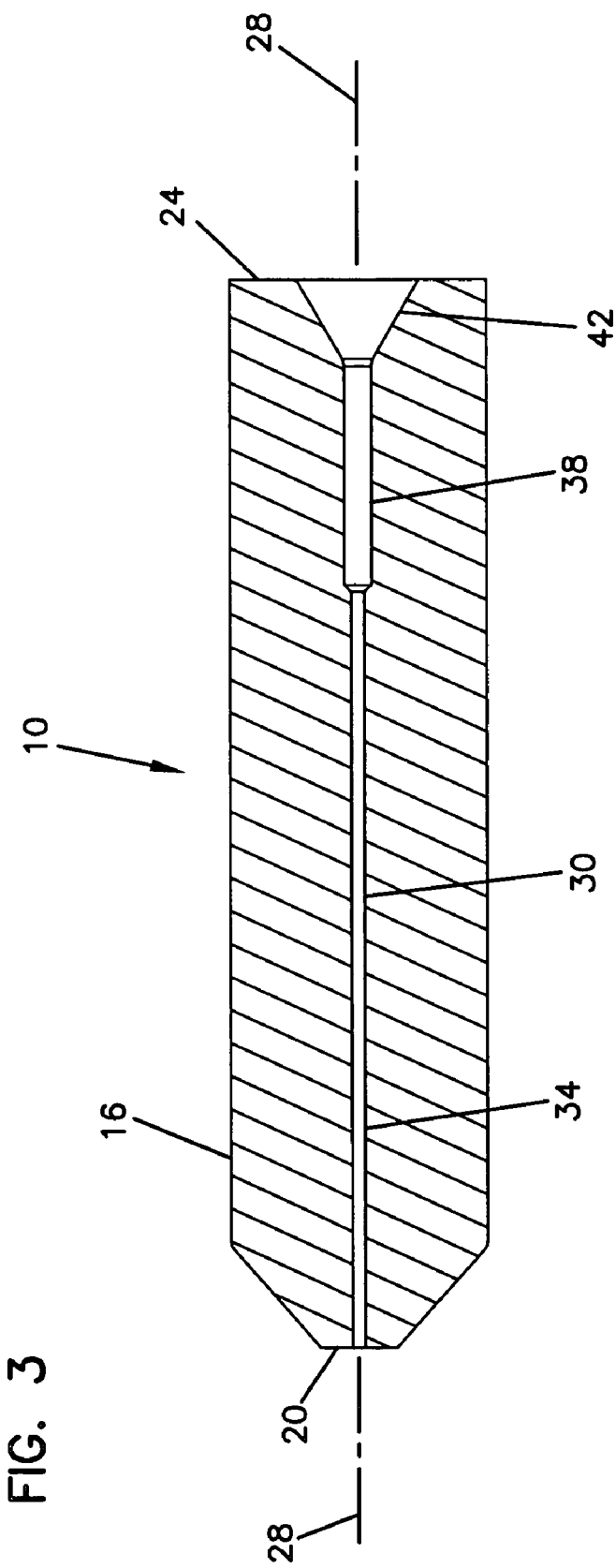
FIG. 3 is a cross-sectional side view of the ferrule of FIG. 1.

Referring now to FIGS. 1-7, a preferred embodiment is a fiber optic ferrule 10 is shown mounted to a hub 12. Generally, ferrule 10 and hub 12 are secured together by convenient methods including press fit or adhesive mounts. Ferrule 10 and hub 12 are mounted within a connector housing 13 shown in dashed lines in FIG. 1. Connector housing 13 can be one of a variety of well known connector types, including SC, FC, ST, LX.5, LC, and others. As will be described below, ferrule 10 and hub 12 are connected to an end of a fiber optic cable for use in connectorizing the end of the cable.

Ferrule 10 includes a body 16 with a first end 20 defining a ferrule tip. Body 16 of ferrule 10 includes an opposite end 24 received in a pocket 14 of hub 12. Ferrule 10 includes a central axis 28. First end 20 of ferrule 10 is typically polished along with the fiber after the fiber is installed. Body 16 of ferrule 10 is typically ceramic in construction.

Ferrule 10 includes a central passage 30 concentric with axis 28. Central passage 30 extends from first end 20 to opposite end 24. Central passage 30 includes a first portion 34 having a first diameter, an intermediate or second portion 38 having a second diameter, and a rear or third portion 42. First portion 34 is sized to receive the inner fiber sized at 125 microns. Second portion 38 is sized to receive the portion of the cable including the outer coating at 250 microns. Third portion 42 is tapered inward from opposite end 24 so as to facilitate insertion of the fiber during installation.

Figure 8:
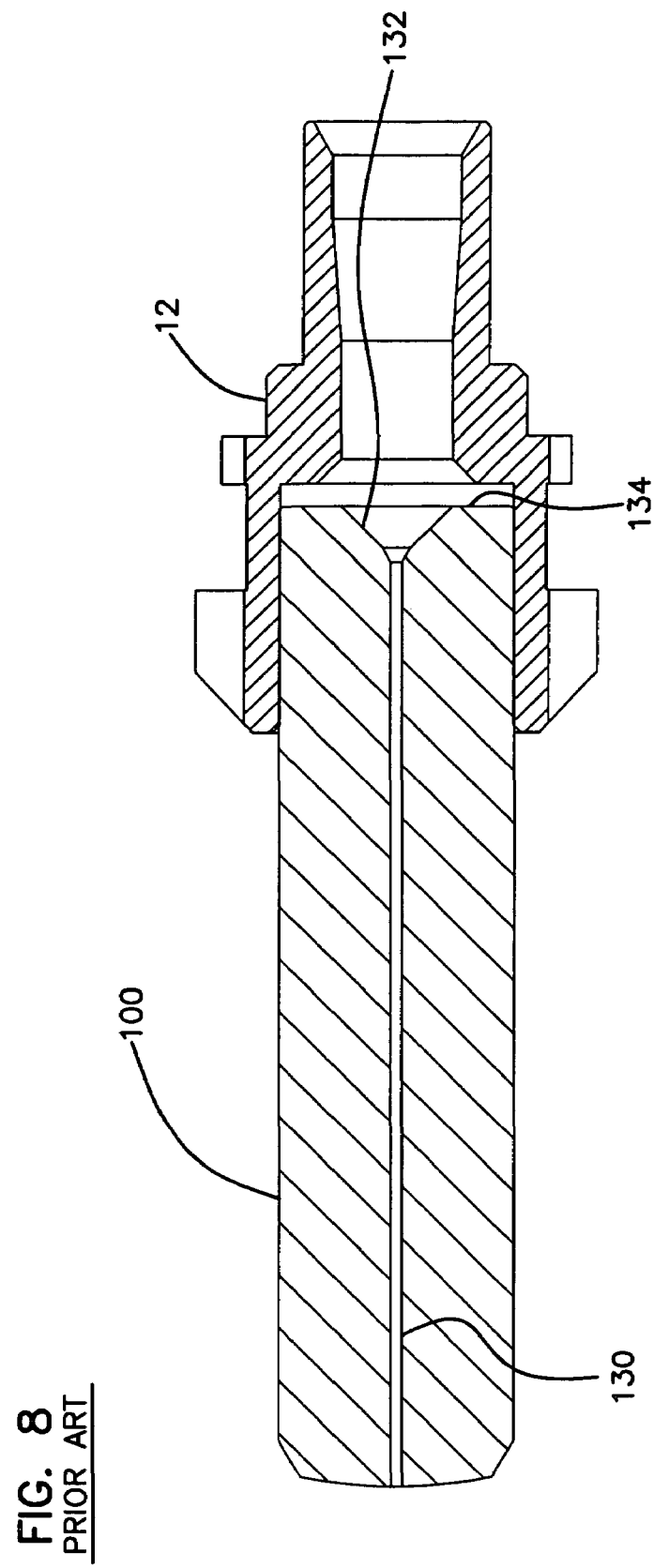
FIG. 8 is a cross-sectional side view of a prior art ferrule and hub.

In prior art ferrules, such as ferrule 100 shown in FIG. 8, dual diameters were not provided. In particular, the ferrule 100 of FIG. 8 includes a central passage 130 having a uniform diameter sized for receipt of the inner fiber at 125 microns. A tapered portion 132 extends from end 134 to central passage 130.

In contrast, ferrule 10 includes dual diameter portions 34, 38, each specially sized to receive the inner fiber (125 microns) and a portion of the outer coating (250 microns), respectively.

Figure 4:
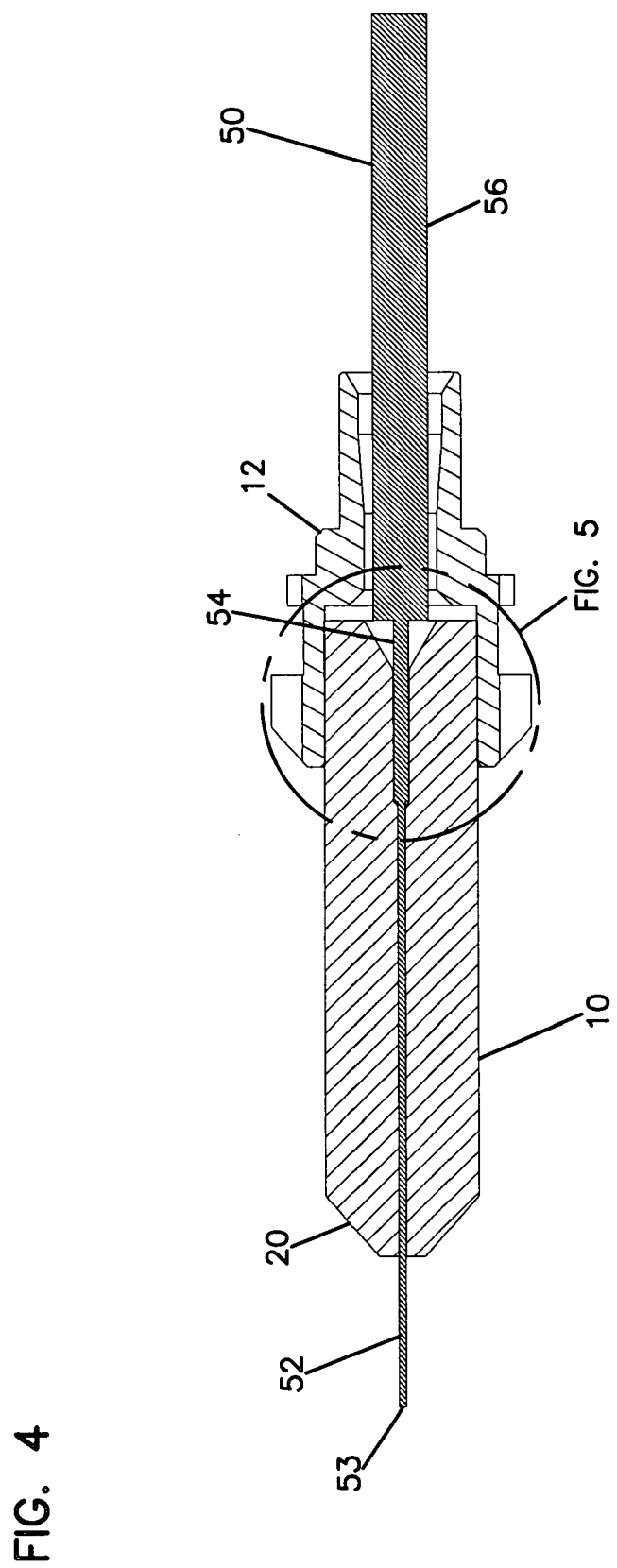
FIG. 4 is a cross-sectional side view of the ferrule and hub of FIG. 1, and including a fiber optic cable inserted into the inner passage through the ferrule.
Figure 5:
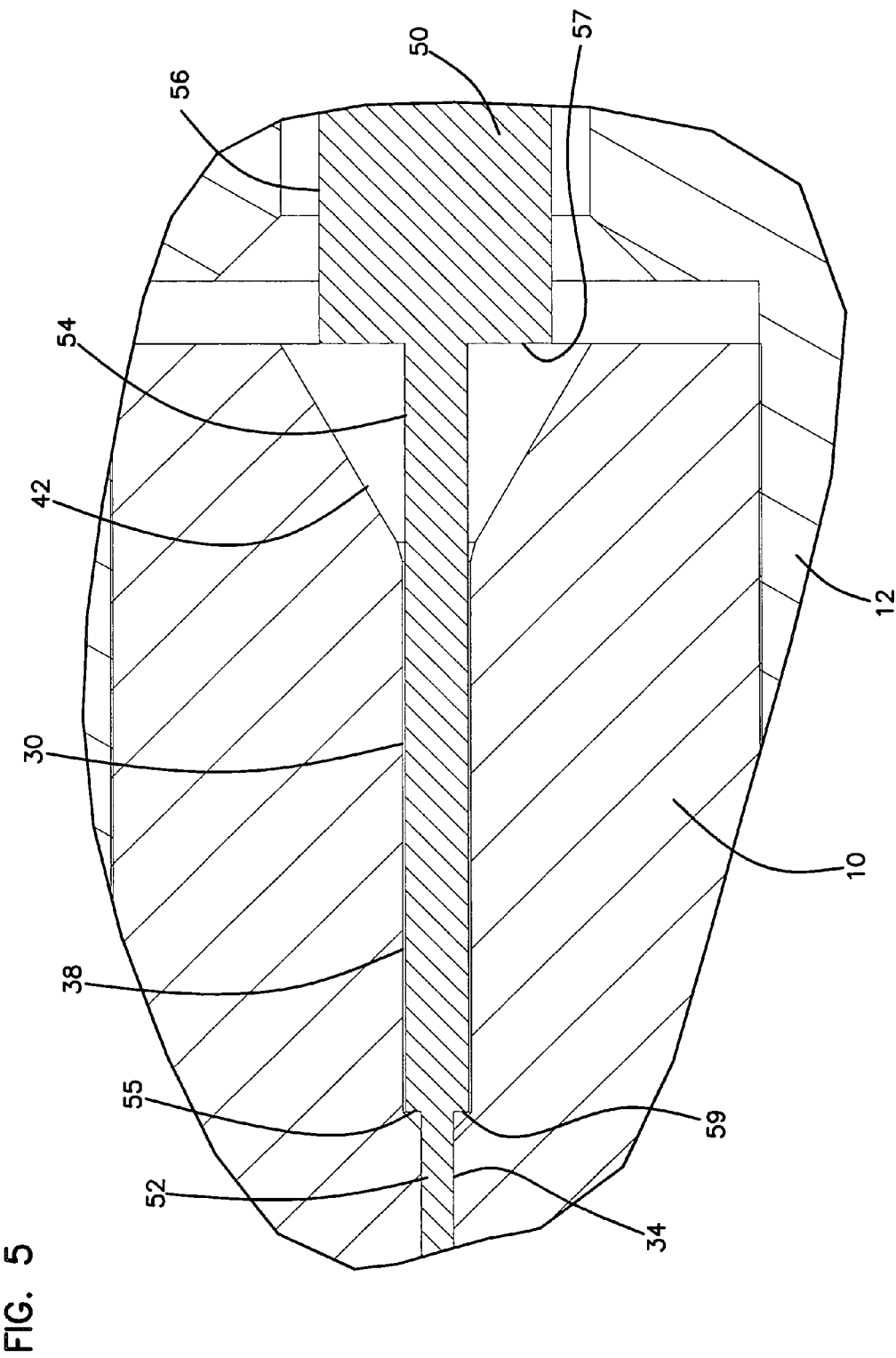
FIG. 5 is an enlarged cross-sectional view of a portion of the ferrule, hub, and cable of FIG. 4.

Referring now to FIGS. 4 and 5, a fiber optic cable 50 is shown with an inner fiber 52, an outer coating 54, and a buffer layer 56. Fiber 52 terminates at end 53. Typically, end 53 is removed and polished with end 20 of ferrule 10. Coating 54 terminates at end 55. Buffer layer 56 terminates at end 57. As shown, a portion of coating 54 extends beyond end 57 of buffer layer 56.

With special reference to FIG. 5, ferrule 10 closely surrounds fiber 52, and coating 54. Epoxy is used within central passage 30 to adhesively hold cable 50 to ferrule 10. However, very little epoxy is positioned around end 55 of coating 54. By reducing the volume of epoxy positioned around end 55 of coating 54, less thermally induced stresses are applied to fiber 52. As shown, passage 30 defines a small conically shaped pocket 59 around end 55 of coating 54. Pocket 59 is the transition area between first and second portions 34, 38 of central passage 30. By allowing coating 54 to extend past end 57 of buffer layer 56, and then be received in pocket 59, a smaller amount of epoxy is in contact with fiber 52 adjacent end 55 of coating 54. Less epoxy around the interface between coating 54 and fiber 52 will reduce the thermal effects caused by any differences in thermal expansion between fiber 52 and the epoxy.

Figure 6:
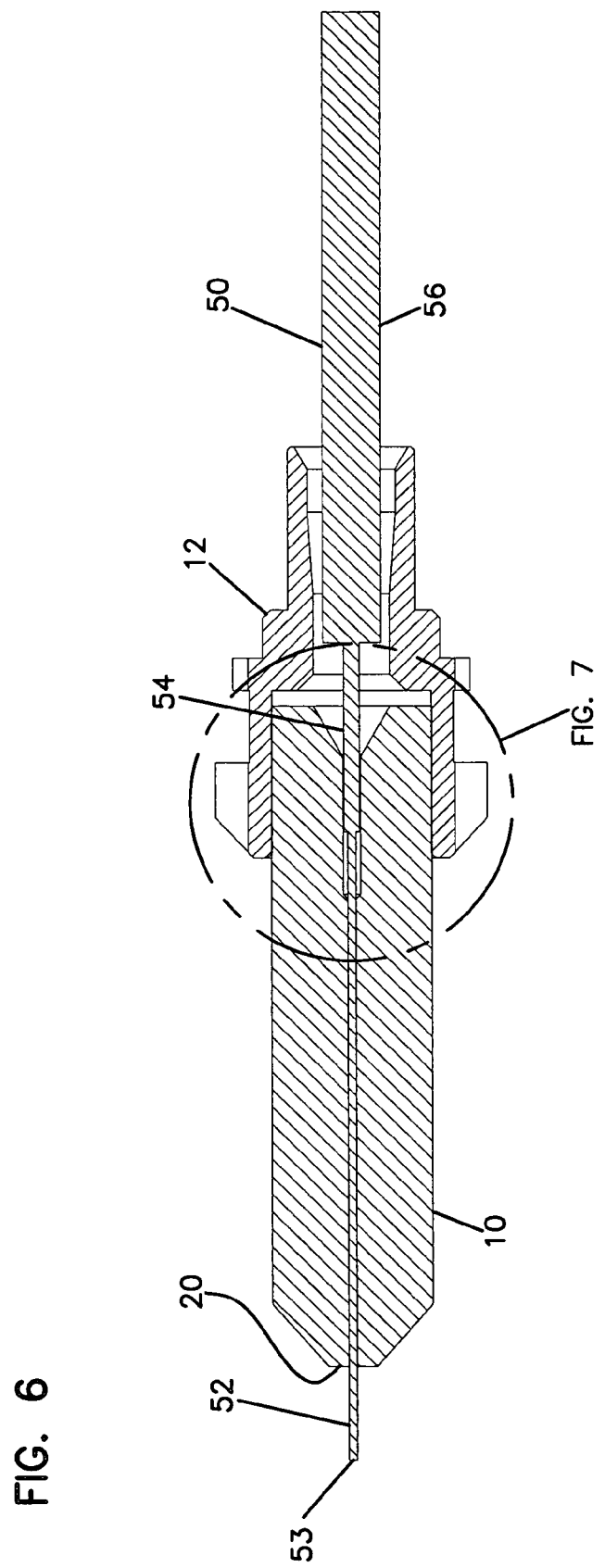
FIG. 6 is a cross-sectional side view of the ferrule and hub of FIG. 1, and including a fiber optic cable inserted into the inner passage through the ferrule, with the fiber coating layer not as fully inserted into the ferrule.
Figure 7:
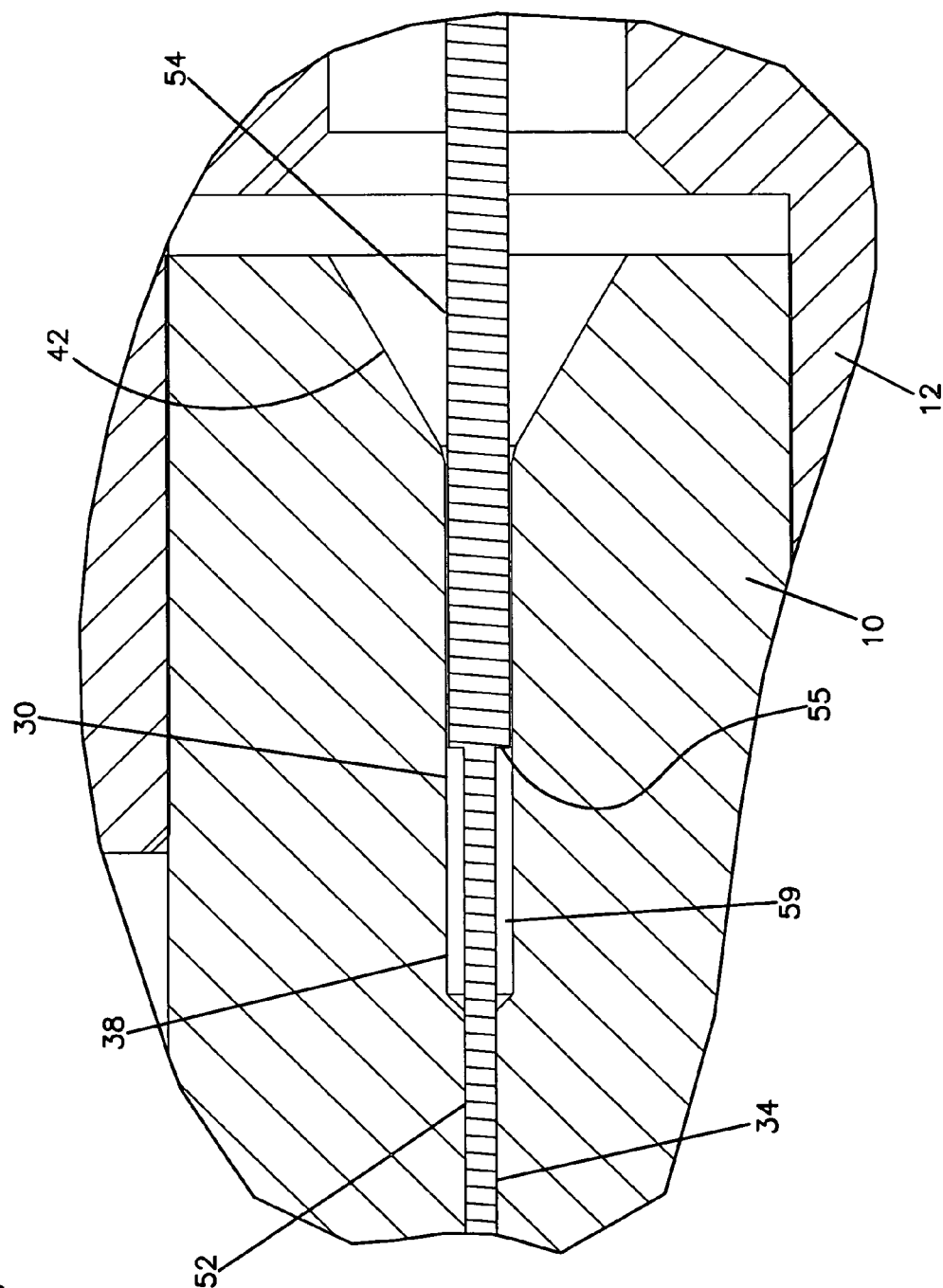
FIG. 7 is an enlarged cross-sectional view of a portion of the ferrule, hub, and cable of FIG. 6.

Coating 54 does not need to be fully inserted into ferrule 10, as shown in FIGS. 4 and 5. As shown in FIGS. 6 and 7, pocket 59 is larger around the end 55 of coating 54. Such an arrangement still provides less epoxy around fiber 52, than in the arrangement of FIG. 8. One example epoxy is F123 from Tra-con, Inc. of Bedford, Mass.

In ferrule 10, first portion 34 has a first dimension sized large enough to receive the uncoated fiber, but not so large as to receive the coated fiber. Second portion 38 has a second dimension large enough to receive the coated fiber, but not so large as to receive the buffer.

In the illustrated embodiment, first portion 34 is cylindrically shaped and sized at 0.1255 mm+/−0.0015/0.0000 mm to receive the inner fiber sized at 125 microns. Second portion 38 is cylindrically shaped and sized at 0.260 mm+/− 0.010 mm to receive the portion of the cable including the outer coating at 250 microns. A preferred range for second portion 38 is greater than 250 microns, and less than or equal to 500 microns. A more preferred range for second portion 38 is greater than 250 microns, and less than or equal to 300 microns. In the illustrated embodiment, ferrule 10 is 10.5 mm long, with second portion 38 extending into ferrule 10 about 3 mm from end 24.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A fiber optic ferrule and cable comprising:
    an optical fiber cable including an inner fiber at 125 microns in outer diameter, an outer coating at 250 microns in outer diameter, and a buffer layer at 900 microns in outer diameter, the outer coating positioned around the inner fiber and the buffer layer positioned around the outer coating;
    a ferrule body extending from a first end to an opposite second end, the ferrule body having an outer cylindrical shape;
    the ferrule body including an axial passage extending between the first and second ends;
    the axial passage including a first diameter portion generally cylindrical in shape having a diameter of at least 125 microns and less than 250 microns for receiving the inner fiber of the optical fiber cable;
    the axial passage including a second diameter portion generally cylindrical in shape having a diameter of at least 250 microns and less than 300 microns for receiving the outer coating of the optical fiber cable, the second diameter portion positioned between the first diameter portion and the second end;
    the axial passage defining a tapered shape at the second end extending inward from the second end to the second diameter portion; and
    a hub mounted around the second end of the ferrule body, the hub including an axial passage, an end of the buffer layer positioned in the axial passage of the hub.

2. A method of assembling a ferrule terminated cable comprising:
    providing a cable with an inner fiber at 125 microns in outer diameter, an outer coating at 250 microns in outer diameter around the inner fiber, and a buffer layer at 900 microns in outer diameter around the outer coating;
    stripping a portion of the outer coating from an end of the cable to expose a portion of the inner fiber;
    stripping a portion of the buffer layer from the end of the cable to expose a portion of the outer coating;
    inserting the exposed portion of the inner fiber and the exposed portion of the outer coating into a ferrule body having an axial passage and an outer cylindrical shape, the axial passage of the ferrule body having first and second inner diameters, wherein the first inner diameter is at least 125 microns and less than 250 microns and only receives the inner fiber and no outer coating, and the second inner diameter is at least 250 microns and less than 300 microns and receives at least a portion of the outer coating and no buffer layer, the ferrule body mounted to a hub adjacent to an end of the ferrule body, the axial passage of the ferrule body having a tapered shape adjacent the end of the ferrule body tapering down to the second inner diameter, the hub including an axial passage, an end of the buffer layer positioned in the axial passage of the hub; and
    adhesively holding the exposed portion of the inner fiber to the axial passage of the ferrule body.

* * * * *